United States Patent
Takata

(10) Patent No.: US 12,038,889 B2
(45) Date of Patent: Jul. 16, 2024

(54) DATA INTEGRATION METHOD AND DATA INTEGRATION SYSTEM

(71) Applicant: HITACHI, LTD., Tokyo (JP)

(72) Inventor: Mika Takata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 80 days.

(21) Appl. No.: 17/469,582

(22) Filed: Sep. 8, 2021

(65) Prior Publication Data

US 2022/0156234 A1 May 19, 2022

(30) Foreign Application Priority Data

Nov. 13, 2020 (JP) ................................ 2020-189622

(51) Int. Cl.
| | |
|---|---|
| *G06F 16/00* | (2019.01) |
| *G06F 16/215* | (2019.01) |
| *G06F 16/23* | (2019.01) |
| *G06F 16/25* | (2019.01) |
| *G06F 16/28* | (2019.01) |

(52) U.S. Cl.
CPC ........ *G06F 16/215* (2019.01); *G06F 16/2365* (2019.01); *G06F 16/258* (2019.01); *G06F 16/285* (2019.01)

(58) Field of Classification Search
CPC .. G06F 16/215; G06F 16/2365; G06F 16/258; G06F 16/285
See application file for complete search history.

(56) References Cited

U.S. PATENT DOCUMENTS

| | | | |
|---|---|---|---|
| 10,140,421 B1 * | 11/2018 | Bernard | .............. A61B 8/468 |
| 2014/0181614 A1 * | 6/2014 | Kwok | ............. H03M 13/1575 |
| | | | 714/755 |
| 2016/0189052 A1 * | 6/2016 | González | ............... G06F 16/48 |
| | | | 706/52 |
| 2021/0004589 A1 * | 1/2021 | Turkelson | ............. G06V 10/82 |
| 2021/0248033 A1 * | 8/2021 | Boehm | ............. G06F 11/0772 |

FOREIGN PATENT DOCUMENTS

| | | | |
|---|---|---|---|
| JP | 2020-052943 A | 4/2020 | |
| WO | 2020/079749 A1 | 4/2020 | |
| WO | WO-2021189730 A1 * | 9/2021 | ......... G06F 16/9024 |

OTHER PUBLICATIONS

Anokhin et al: "Data Integration: Inconsistency Detection and Resolution Based on Source Properties", George Mason University, Fairfax US, pp. 1-15 (2001).

(Continued)

*Primary Examiner* — Diedra McQuitery
(74) *Attorney, Agent, or Firm* — Volpe Koenig

(57) ABSTRACT

In the present invention, there is provided a data integration method executed by a data integration system that corrects inconsistency in type or quality between first data and second data stored in a data lake. The method includes a feature value calculation step of calculating feature values of the first data and the second data, an inconsistency detection step of detecting the inconsistency between the first data and the second data based on the feature values, and a data adjustment step of correcting the inconsistency by using an integrated view according to a request to acquire the first data and the second data from a user.

12 Claims, 17 Drawing Sheets

(56) References Cited

OTHER PUBLICATIONS

Curino et al., "Automating Database Schema Evolution in Information System Upgrades," Proceedings of the 2nd International Workshop on Hot Topics in Software Upgrades, HotSWUp '09, pp. 1-5 (2009).
Bernstein et al., "Generic Schema Matching, Ten Years Later," PVLDB. 4. pp. 695-701 (2011).

* cited by examiner

| TABLE NAME ⌒10111 | COLUMN NAME ⌒10112 | DATA TYPE ⌒10113 | DATA FORMAT ⌒10114 | RECORD IDENTIFICATION NUMBER ⌒10115 | CLUSTER NUMBER ⌒10116 | CLUSTER CENTER VALUE ⌒10117 |
|---|---|---|---|---|---|---|
| Lab_test | Test_date | Timestamp(0) | yyyy/MM/dd hh:mm:ss | [1,2,3,4,...10] | 1 | (1,1) |
| Lab_test | Test_date | Timestamp(0) | yyyy-MM-dd hh:mm:ss | [11,12,13,14,...20] | 2 | (1,2) |
| Lab_test | Test_date | Date | yyyy-MM-dd | [21,22,23,...30] | 3 | (2,3) |
| ... | ... | ... | ... | ... | ... | ... |

| CLUSTER NUMBER (1) ~10121 | CLUSTER NUMBER (2) ~10122 | DISTANCE Dis ~10123 | FEATURE VALUE 1 DIFFERENCE diff (1) ~10124 | FEATURE VALUE 2 DIFFERENCE diff (2) ~10125 |
|---|---|---|---|---|
| 1 | 2 | 1 | 0 | 1 |
| 1 | 3 | $\sqrt{2}$ | 1 | 1 |
| .. | .. | .. | .. | .. |

Dis_criteria = 1

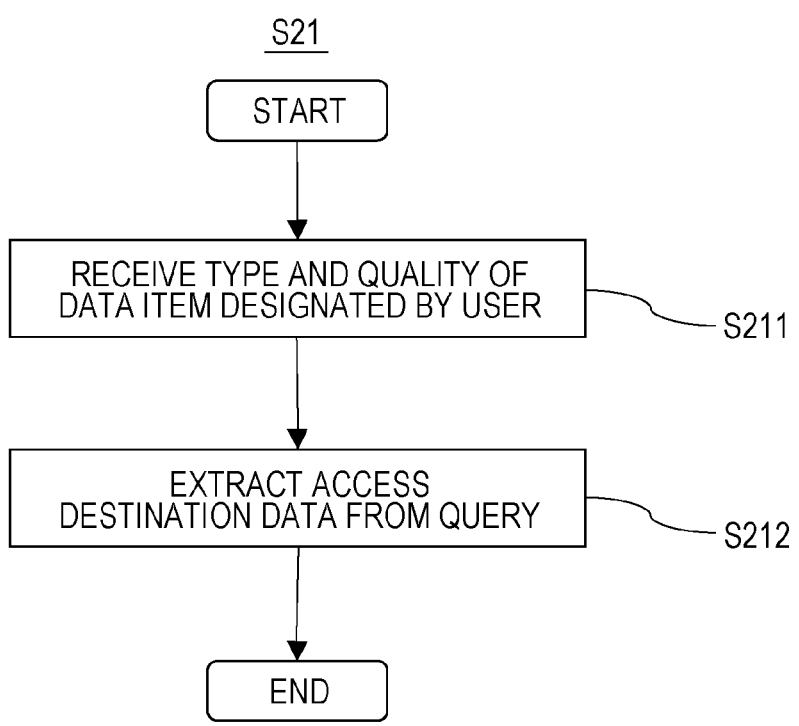

*FIG. 13A*

QUERY EXAMPLE 1

Select Patient_ID, Test_date, Test_id, Test_result
from Lab_Test
Where Test_date between 2016-01-01 00:00:00 and 2020-04-02 23:59:59

*FIG. 13B*

QUERY EXAMPLE 2

Select Patient_ID, Test_date, Test_id, Test_result
from Lab_Test
Where Patient_id = 'P00001'
and (Test_result == 'H' or Test_result == 'L' )

DATA INTEGRATION METHOD AND DATA INTEGRATION SYSTEM

BACKGROUND OF THE INVENTION

1. Field of the Invention

The present invention related to a data integration method and a data integration system.

2. Description of the Related Art

Various forms of data such as structured data such as Comma Separated Value (CSV) and non-structured data such as a text file are accumulated and managed in a data lake. Some of such data may have a different data type or data quality even for data with the same data identifier due to factors such as a data protocol change, a sensor change, and a vendor change. As described above, there is data inconsistency before and after in time or caused by a change in the same data, or inconsistent data like a case where there is a plurality of pieces of data with the same identifier in different spatial positions may be generated.

In a business application using such data, managed data is extracted, data preparation processing is constructed on the assumption that a type or quality of data becomes constant or in a certain range by cleansing, data conversion, or the like, and a system is constructed such that the business application can operate normally (for example, see WO2020/079749 and JP 2020 052943 A).

SUMMARY OF THE INVENTION

Here, when inconsistency in type or quality between data assumed by the business application and actual data is caused, since the business application falls into an error or an insufficient function, it is possible to promptly detect the data inconsistency, correct the data preparation processing, and cope with the detected data inconsistency.

However, in the technology of the related art, a rule for establishing consistency of data can be automatically detected, but an engineer corrects the business application based on the detected rule. It is difficult to perform the data preparation processing on the business application whenever the data inconsistency is detected. That is, as the number of accumulated data becomes larger and the data becomes diverse, the data inconsistency generally increases. Thus, as data is adjusted according to a type or quality of data assumed for each application, engineering man-hours increase, and an adverse effect on the business using the business application becomes serious.

The present invention has been made in view of the above problems, and an object thereof is to automatically detect data inconsistency and automatically adjust a type or quality of data based on a type or quality of data desired by a user.

In order to achieve the object, a data integration method executed by a data integration system that corrects inconsistency in type or quality between first data and second data stored in a data lake. The method includes a feature value calculation step of calculating feature values of the first data and the second data, an inconsistency detection step of detecting the inconsistency between the first data and the second data based on the feature values, and a data adjustment step of correcting the inconsistency by using an integrated view according to a request to acquire the first data and the second data from a user.

According to the present invention, it is possible to automatically detect data inconsistency and automatically adjust a type or quality of data based on a type and quality of data desired by a user.

BRIEF DESCRIPTION OF THE DRAWINGS

FIG. 3 is a diagram illustrating an example of a cluster table of the first embodiment;

FIG. 4 is a diagram illustrating an example of a map table of the first embodiment;

FIG. 6 is a diagram illustrating an example of inconsistency detection definition of the first embodiment;

FIG. 12 is a flowchart illustrating detailed processing of query interpretation of the first embodiment;

FIG. 13A is a diagram illustrating an example of an SQL query (continuous-type data extraction) of the first embodiment;

FIG. 13B is a diagram illustrating an example of an SQL query (discrete-type data extraction) of the first embodiment;

DESCRIPTION OF THE PREFERRED EMBODIMENTS

Hereinafter, embodiments of the present invention will be described with reference to the drawings. The embodiments to be described below do not limit inventions according to the claims, and all elements and combinations described in the embodiments are not essential for the solution of the invention. The illustrations and descriptions of configurations that are essential but well-known to configurations of the inventions may be omitted. The number of elements illustrated in each drawing is an example, and is not limited to the illustration. Terms used throughout the specification are provided as examples and are not intended to be limiting.

In the following description, although embodiments related to medical data of a hospital are disclosed, the present invention is not limited thereto. The present invention can be extended to fields handling various and large amounts of data in various fields such as government agencies, industry, and finance.

First Embodiment

Figure 1:
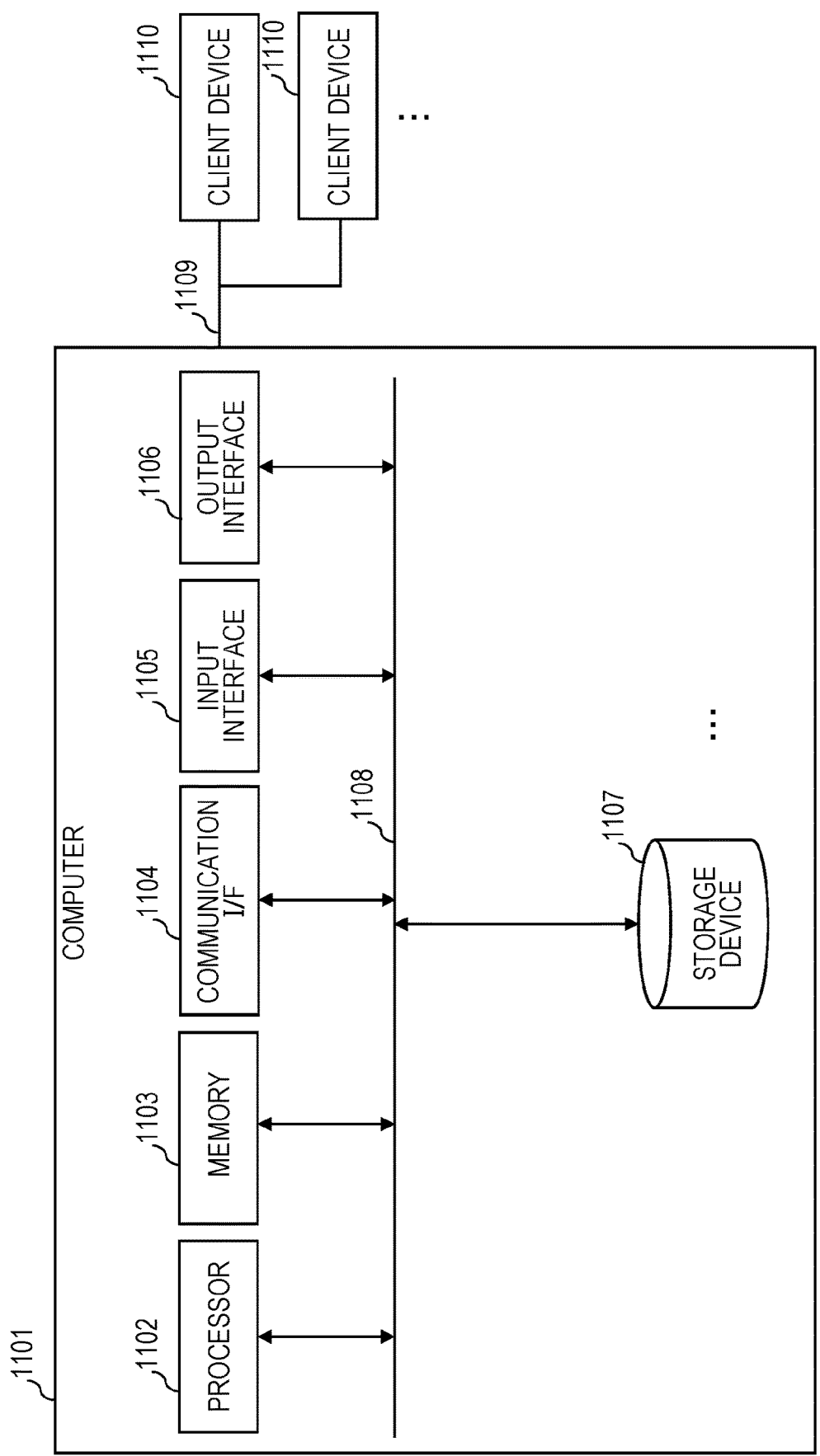
FIG. 1 is a diagram illustrating an example of a hardware configuration of a computer constituting a data integration system of a first embodiment.

Hardware configuration of computer 1101 constituting data integration system S FIG. 1 is a diagram illustrating an example of a hardware configuration of a computer 1101 constituting a data integration system S according to a first embodiment. The computer 1101 is a server, a storage, or the like. The computer includes elements for performing data management, such as a processor 1102, a memory 1103, a communication I/F 1104, an input interface 1105, an output interface 1106, and a storage device 1107.

The elements included in the computer 1101 are connected to each other through a bus 1108. The computer 1101 is connected to one or a plurality of external client devices 1110 through a network 1109 such as a local area network (LAN) or a wide area network (WAN), and transmits and receives data in a bidirectional or unidirectional manner.

The client device 1110 accepts an input of a user via a GUI or the like and transmits the input to the computer 1101. The client device 1110 receives a processing result corresponding to the input of the user from the computer 1101, and displays the processing result to the user via a GUI or the like. The processor 1102 is a hardware processor such as an ASIC or a PLD, a software processor such as a CPU, or a combination of the hardware processor and the software processor.

Functional Configuration of Data Integration System S

Figure 2:
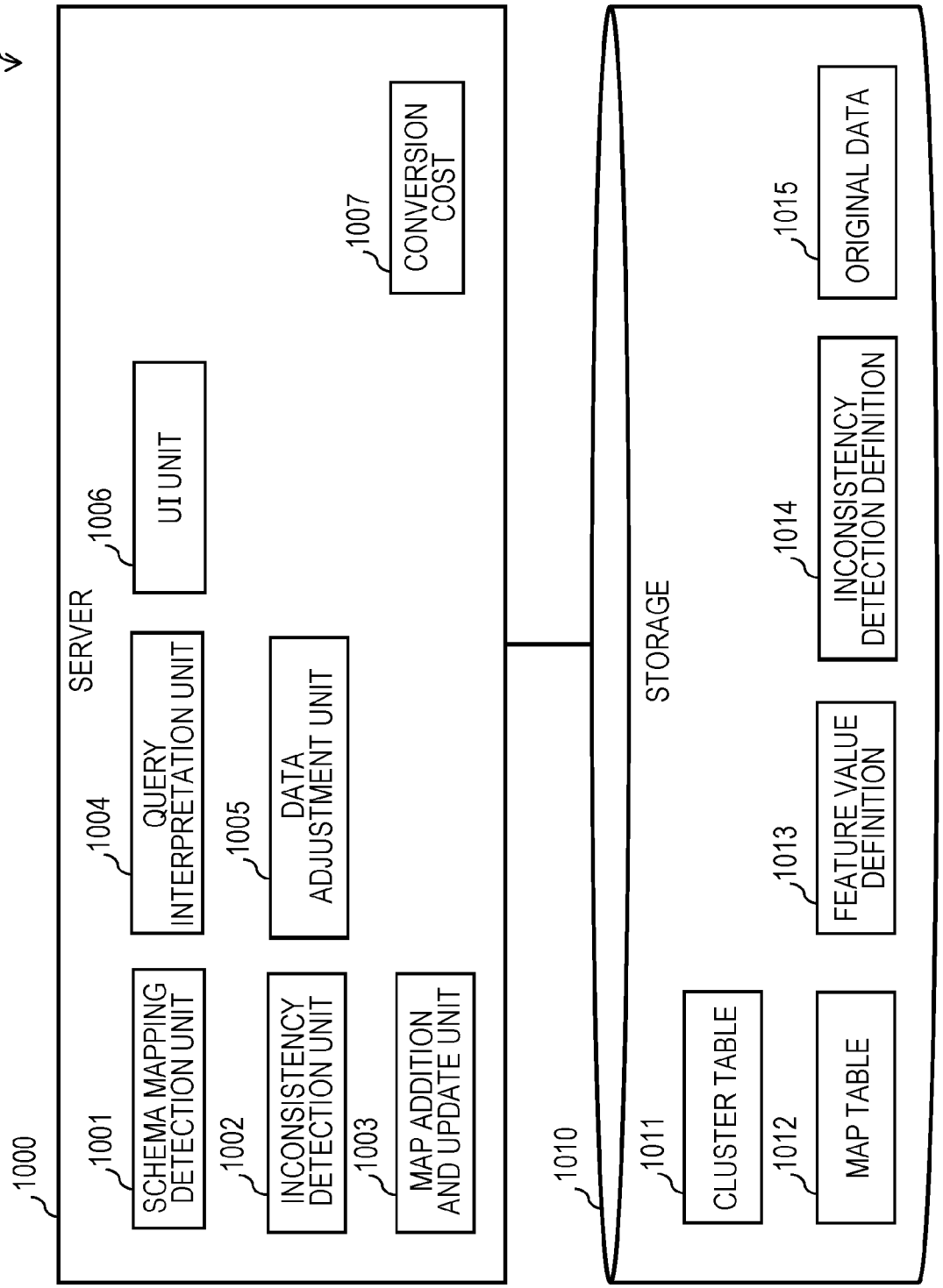
FIG. 2 is a diagram illustrating an example of a functional configuration of the data integration system of the first embodiment.

FIG. 2 is a diagram illustrating an example of a functional configuration of the data integration system S of the first embodiment. The data integration system S includes a server 1000 and a storage 1010. The server 1000 and the storage 1010 are connected to be able to cooperate with each other.

The server 1000 includes a schema mapping detection unit 1001, an inconsistency detection unit 1002, a map addition and update unit 1003, a query interpretation unit 1004, a data adjustment unit 1005, and a UI unit 1006, and stores conversion cost 1007.

The storage 1010 stores a cluster table 1011, a map table 1012, feature value definition 1013, inconsistency detection definition 1014, and original data 1015. Although an example in which the original data 1015 is data as a target of inconsistency detection and data adjustment and is stored in a data lake in the storage 1010 will be described for the sake of simplicity in description in FIG. 2, the original data may be stored in a data lake in a device other than the storage 1010.

Functional units related to data consistency establishment such as the schema mapping detection unit 1001, the inconsistency detection unit 1002, the map addition and update unit 1003, the query interpretation unit 1004, and the data adjustment unit 1005 are arranged in the server 1000 for the sake of convenience in description in FIG. 2. However, the present invention is not limited thereto, and there are various forms such as arrangement in the data lake that stores the original data 1015, arrangement outside the data lake, or arrangement in a database management system (DBMS) that issues SQL.

Cluster Table 1011

FIG. 3 is a diagram illustrating an example of the cluster table 1011 of the first embodiment. The cluster table 1011 has columns of a table name 10111, a column name 10112, a data type 10113, a data format 10114, a record identification number 10115, a cluster number 10116, and a cluster center value 10117.

The column name 10112 is a name of an item given as a tag or a column in the table specified by the table name 10111. The data type 10113 is a type of data of the column name 10112, and the data format 10114 is format information of the data type 10113. For example, when the data type 10113 is Timestamp (0) (date-and-time type), an expression format of data in a cluster is determined such that the data format 10114 is "yyyy/MM/dd hh:mm:ss".

The record identification number 10115 is an identification number of a record constituting a cluster among records in the table given by the table name 10111. The cluster number 10116 is an identification number of a cluster including records identified by the record identification number 10115. The cluster center value 10117 is a center value in a feature vector space of a cluster identified by the cluster number 10116. The cluster is an example of a group, and clustering is an example of grouping.

Map Table 1012

FIG. 4 is a diagram illustrating an example of the map table 1012 of the first embodiment. The map table 1012 includes a cluster number (1) 10121, a cluster number (2) 10122, and a distance (Dis) 10123, a feature value 1 difference (diff (1)) 10124, and a feature value 2 difference (diff (2)) 10125.

The distance 10123 is a distance between two clusters specified by the cluster number (1) 10121 and the cluster number (2) 10122. The feature value 1 difference (diff (1)) 10124 is a difference between two clusters specified by the cluster number (1) 10121 and the cluster number (2) 10122 for a first feature value. The feature value 2 difference (diff (2)) 10125 is a difference between two clusters specified by the cluster number (1) 10121 and the cluster number (2) 10122 for a second feature value.

Feature Value Definition 1013

Figure 5A:
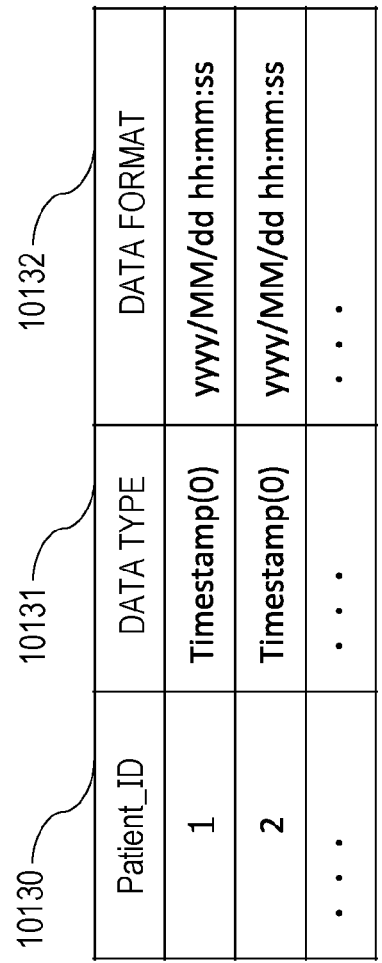
FIG. 5A is a diagram illustrating an example of feature value definition (continuous value) of the first embodiment.

FIG. 5A is a diagram illustrating an example of the feature value definition 1013 (continuous value) of the first embodiment. The feature value definition 1013 (continuous value) indicates that a data type 10131 of the continuous value is Timestamp (0) (date-and-time type) and a data format 10132 as the feature value is "yyyy/MM/dd hh:mm:ss", for example, for data of which Patient_ID 10130 is "1".

Figure 5B:
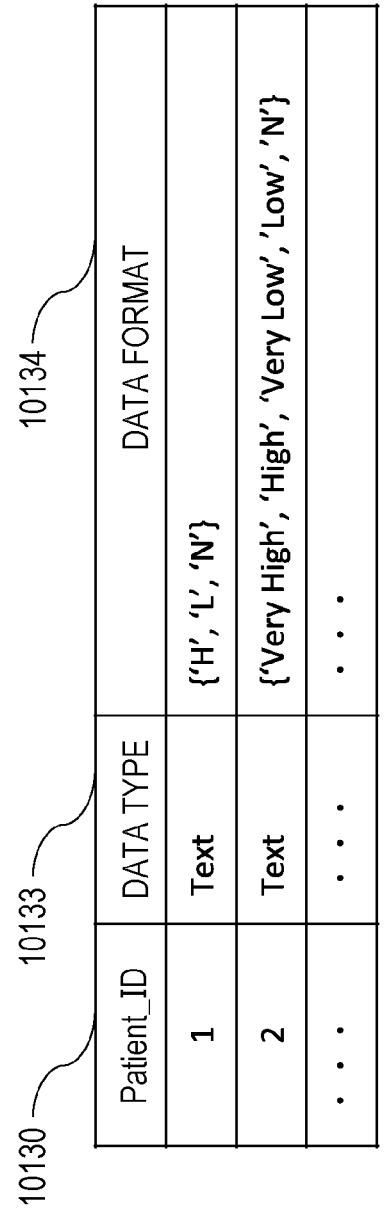
FIG. 5B is a diagram illustrating an example of feature value definition (discrete value) of the first embodiment.

FIG. 5B is a diagram illustrating an example of the feature value definition 1013 (discrete value) of the first embodiment. The feature value definition 1013 (discrete value) indicates that a data type 10133 of the discrete value is Text and a data format 10134 as the feature value is "{'H', 'L', 'N'}", for example, for data of which Patient_ID 10130 is "1".

Inconsistency Detection Definition 1014

Figure 6:
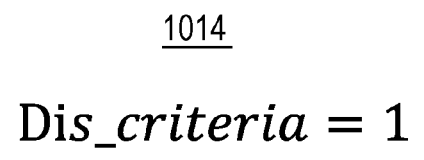

FIG. 6 is a diagram illustrating an example of the inconsistency detection definition 1014 of the first embodiment. The inconsistency detection definition 1014 is a threshold used at the time of the inconsistency detection. In the example of FIG. 6, the threshold is 1, but can be changed as appropriate.

Data Inconsistency Detection Processing

Figure 7:
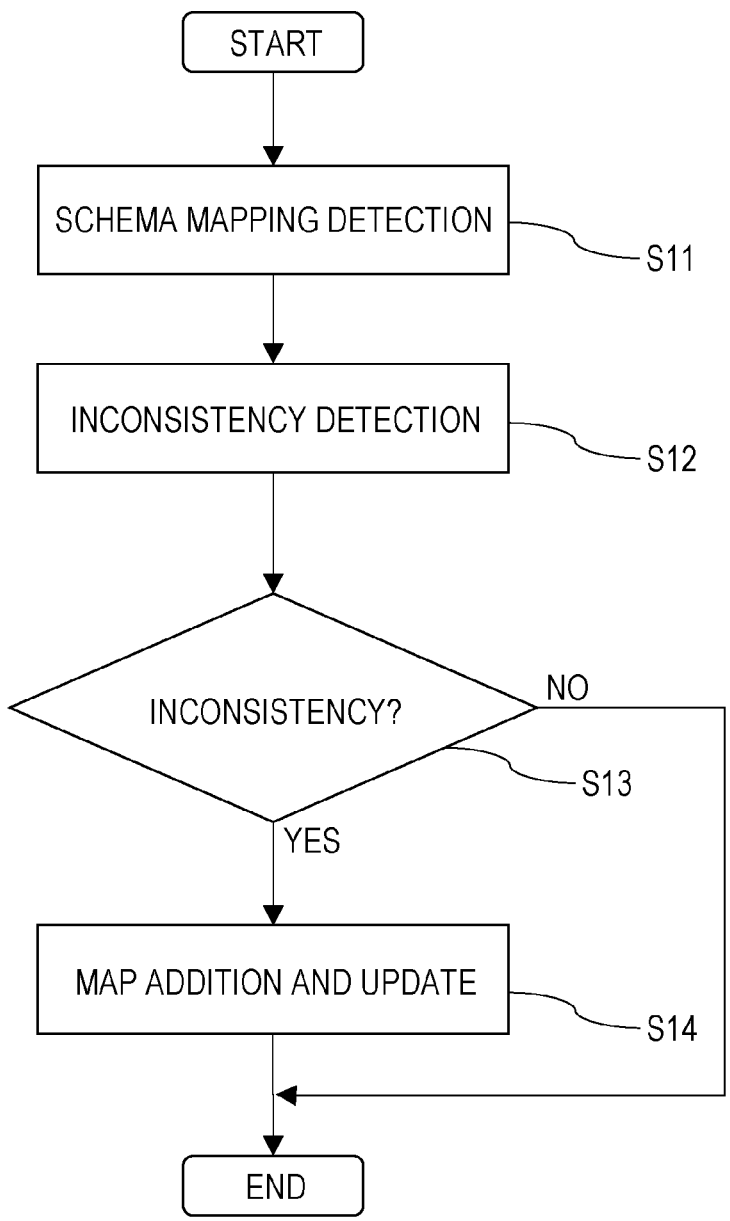
FIG. 7 is a flowchart illustrating data inconsistency detection processing of the first embodiment.

FIG. 7 is a flowchart illustrating data inconsistency detection processing of the first embodiment. In the data inconsistency detection processing, an inconsistency in type or quality of pieces of data is detected. The data inconsistency detection processing is executed periodically or at an instruction timing of an engineer.

First, in S11, the schema mapping detection unit 1001 executes schema mapping detection. Detailed processing of schema mapping detection S11 will be described later with reference to FIG. 8.

Subsequently, in S12, the inconsistency detection unit 1002 executes inconsistency detection. In the inconsistency detection, the inconsistency detection unit 1002 discriminates a cluster to which new data in a feature value space belongs, and stores the discriminated cluster information in the cluster table 1011. When the cluster to which the new data belongs is not an existing cluster but a new cluster, the inconsistency detection unit 1002 outputs an inconsistency detection flag. Detailed processing of inconsistency detection S12 will be described later with reference to FIG. 9.

Subsequently, in S13, the inconsistency detection unit 1002 shifts the processing to S14 when the inconsistency detection flag is output in S12, and ends the data inconsistency detection processing when the inconsistency detection flag is not output.

In S14, the map addition and update unit 1003 adds a new record to the map table 1012 or updates the record of the map table 1012 for the new cluster and the existing cluster detected in S12. Detailed processing of map addition and update S14 will be described later with reference to FIG. 10.

Detailed Processing of Schema Mapping Detection S11

Figure 8:
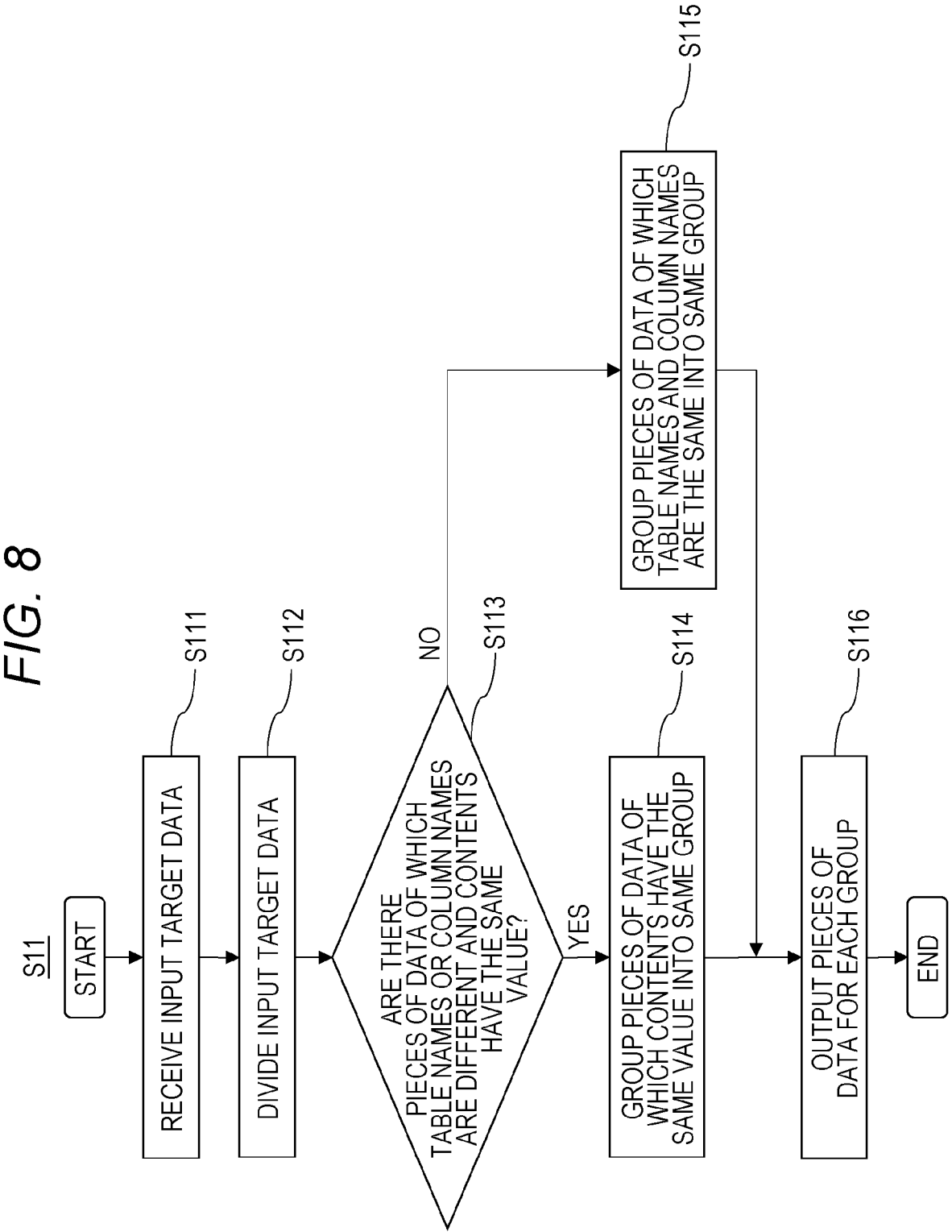
FIG. 8 is a flowchart illustrating detailed processing of schema mapping detection of the first embodiment.

FIG. 8 is a flowchart illustrating the detailed processing of schema mapping detection S11 of the first embodiment. First, in S111, the schema mapping detection unit 1001 receives input target data from the original data 1015 in the data lake. Subsequently, in S112, the schema mapping detection unit 1001 divides the input target data received in S111 for each table name and each column (item) name of a data model. Examples of the data model include a structured data file format such as a relational database (RDB) format or a CSV format. A tag or the like given to data having no column name at the time of data loading is also equivalent to the column name.

Subsequently, in S113, the schema mapping detection unit 1001 determines whether there is a combination of pieces of data in which at least one of the table names or the column names are different but data contents have the same value among the pieces of data divided in S112. The content of the data is an entity of data other than attributes of the data such as the table name and the item name. The schema mapping detection unit 1001 shifts the processing to S114 when there is such a combination of pieces of data (YES in S113), and shifts the processing to S115 when there is not such a combination of pieces of data (NO in S113).

In S114, the schema mapping detection unit 1001 groups pieces of data in which the contents are the same even though at least one of the table names or the column names are different into the same group as the same table name and column name. At this time, the pieces of data grouped into the same group may be converted into a common data schema. On the other hand, in S115, the pieces of data having the same set (table name and column name) are grouped into the same group. Finally, in S116, the schema mapping detection unit 1001 outputs the pieces of data grouped (clustered) into the same group in S114 or S115 for each group. The schema mapping detection unit 1001 stores the pieces of data for each group in the cluster table 1011.

Detailed Processing of Inconsistency Detection S12

Figure 9:
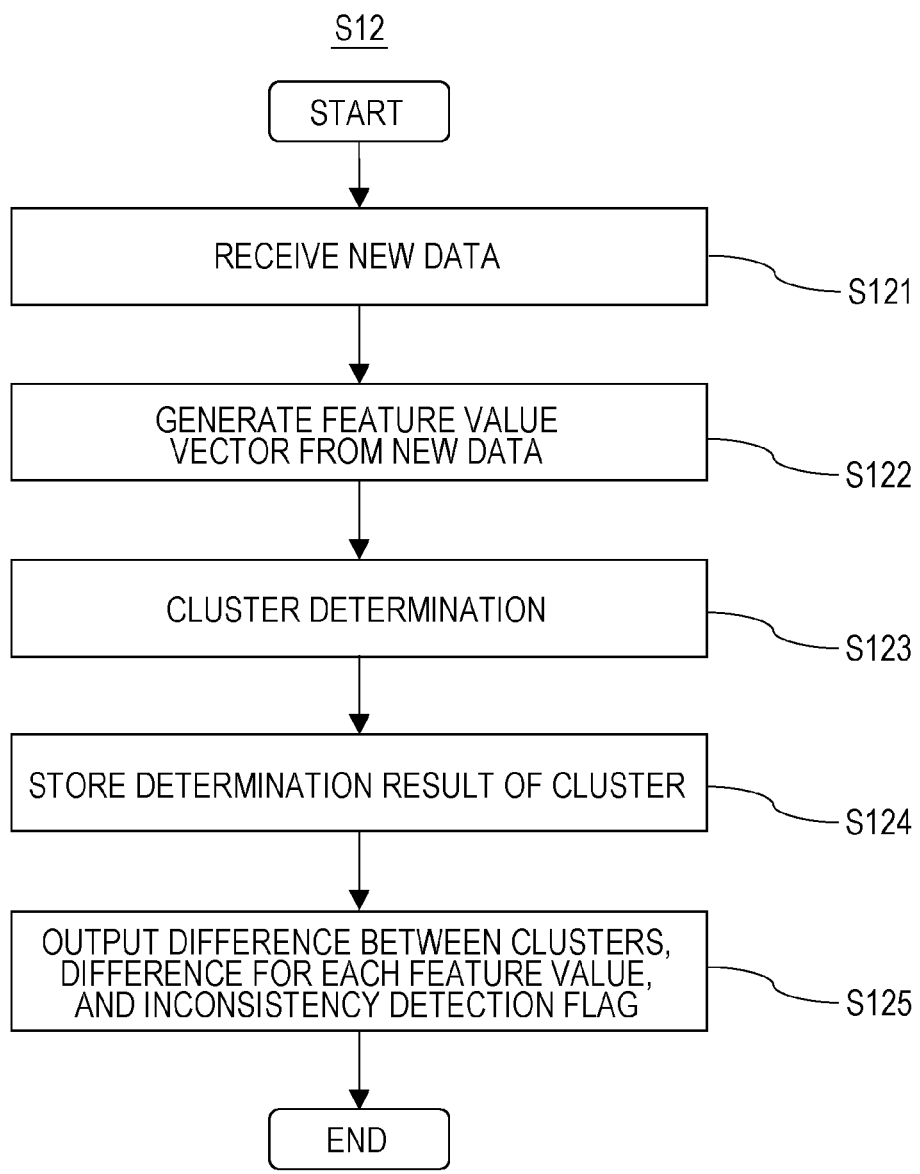
FIG. 9 is a flowchart illustrating detailed processing of inconsistency detection of the first embodiment.

FIG. 9 is a flowchart illustrating the detailed processing of inconsistency detection S12 of the first embodiment. First, in S121, the inconsistency detection unit 1002 receives new data newly loaded as the original data 1015. Subsequently, in S122, the inconsistency detection unit 1002 calculates a feature value vector from the new data received in S121 based on the feature value definition 1013.

Subsequently, in S123, the inconsistency detection unit 1002 determines whether there is the existing cluster corresponding to the table name and the column name of the new data received in S121 in the cluster table 1011. The inconsistency detection unit 1002 determines whether the new data belongs to the existing cluster based on the feature value vector generated in S122, and determines that the new data belongs to the new cluster when the new data does not belong to the existing cluster.

Specifically, the cluster is determined as follows. The distance Dis between new data and a certain existing cluster is calculated, for example, as in the following Equation (1). A feature value of the new data is $f_1=(x1, x2)$, and a center of a feature value of a certain existing cluster is $f_2=(c1, c2)=((a1+a2+ \ldots +am)/m, (b1+b2+ \ldots +bm)/m)$. Feature values of pieces of data already belonging to the existing cluster are (a1, b1), (a2, b2), ..., and (am, bm).

The inconsistency detection unit 1002 determines that the new data belongs to the certain existing cluster when Dis<the value of the inconsistency detection definition 1014 ("1" in the present embodiment), determines that the new data does not belong to the existing cluster in the other case, and specifies the cluster to which the new data belongs. When the new data does not belong to any existing cluster, it is assumed that the new data belongs to a new cluster.

[Math. 1]

$$Dis = \sqrt{(c1-x1)^2 + (c2-x2)^2} \qquad (1)$$

The inconsistency detection unit 1002 calculates the feature value 1 difference (diff (1)) 10124 and the feature value 2 difference (diff (2)) 10125 as in the following Equations (2-1) and (2-2). In the following Equations (2-1) and (2-2), the number of feature values is two, and a feature value difference is calculated by the number of feature values.

[Math. 2]

$$diff(1) = \sqrt{(c1-x1)^2} \qquad (2\text{-}1)$$

$$diff(2) = \sqrt{(c2-x2)^2} \qquad (2\text{-}2)$$

When the new data belongs to the existing cluster in which the center of the feature value is $f_2=(c1, c2)$, the inconsistency detection unit 1002 updates the center $f_2$ of the feature value of the cluster as in the following Equation (3). "c1_next" and "c2_next" in the following Equation (3) are centers of the updated feature values.

$$f_2 = (c1\_next, c2\_next) = \qquad (3)$$
$$((x1 + a1 + a2 + \cdots + am)/m, (x2 + b1 + b2 + \cdots + bm)/m)$$

A difference between feature value vectors of the existing cluster and the new data and a difference for each dimension are not limited to the Euclidean distance, and may be another distance.

Subsequently, in S124, the inconsistency detection unit 1002 adds the cluster name determined in S123 and the values derived in S124 such as the cluster center values to the cluster table 1011. Subsequently, in S125, the inconsistency detection unit 1002 outputs the distance Dis between the clusters and the differences diff (1) and diff (2) for each feature value calculated in S123, and the inconsistency detection flag when the new cluster is generated in S123.

Figure 10:
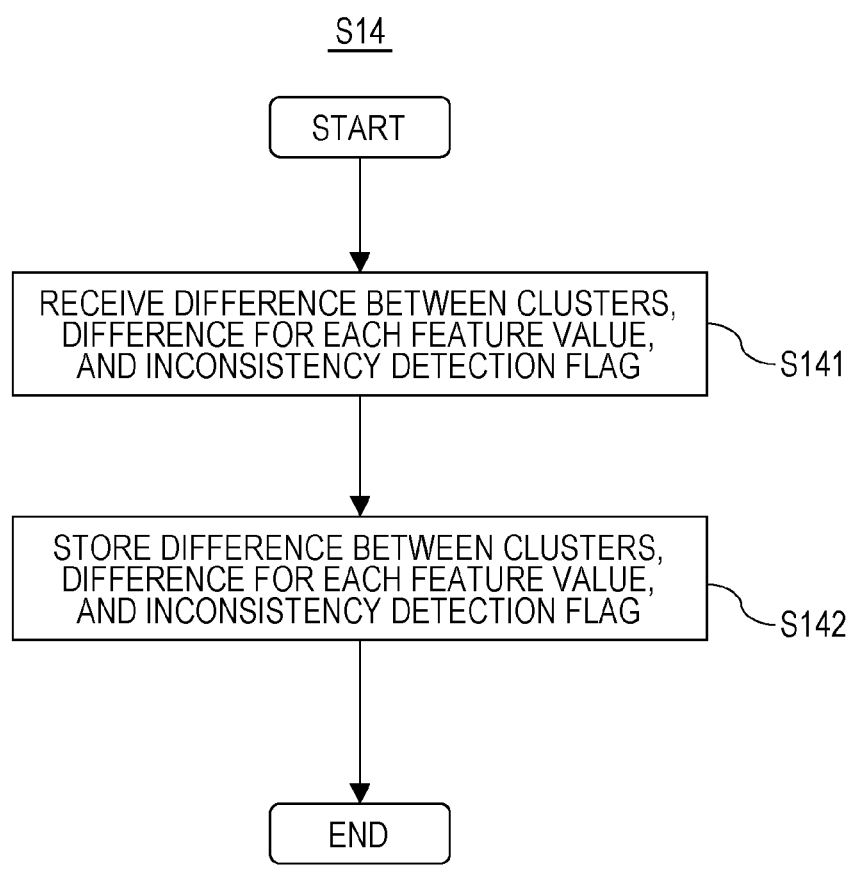
FIG. 10 is a flowchart illustrating detailed processing of map addition and update of the first embodiment.

Detailed processing of map addition and update S14 FIG. 10 is a flowchart illustrating the detailed processing of map addition and update S14 of the first embodiment. First, in S141, the map addition and update unit 1003 receives the output result of S125. Subsequently, in S142, the map addition and update unit 1003 adds the distance Dis between the clusters and the differences diff (1) and diff (2) for each feature value to the map table 1012. In the present embodiment, for example, the case of the two-dimensional feature vector is illustrated, but the same applies to an n-dimensional feature vector.

Data Adjustment Processing

Figure 11:
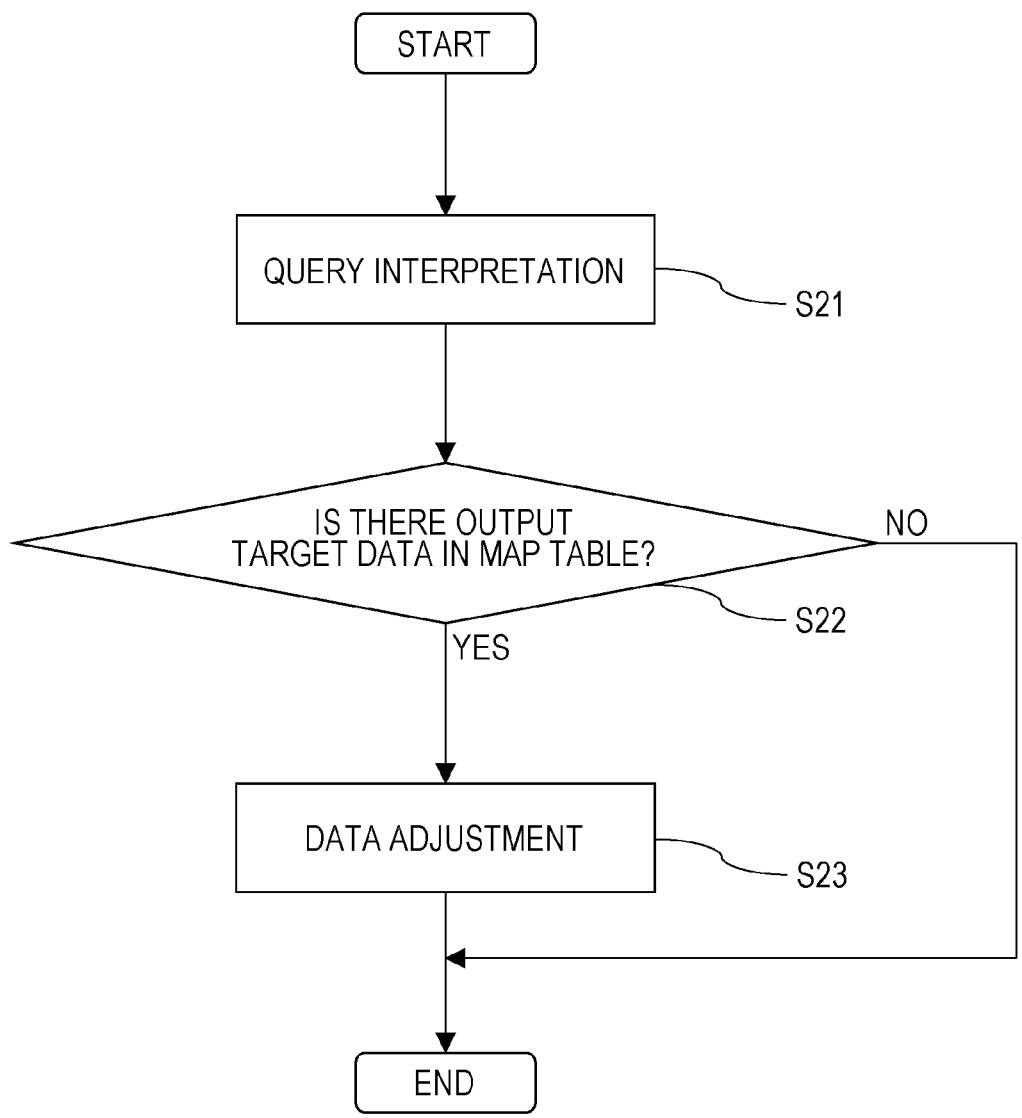
FIG. 11 is a flowchart illustrating data adjustment processing of the first embodiment.

FIG. 11 is a flowchart illustrating data adjustment processing of the first embodiment. The data adjustment processing is processing activated whenever the query interpretation unit 1004 detects a query for the original data 1015.

First, in S21, the query interpretation unit 1004 executes query interpretation. That is, target data of a type of data or quality of data as request targets of the query are extracted. Detailed processing of query interpretation S21 will be described later with reference to FIG. 12.

Subsequently, in S22, the query interpretation unit 1004 determines whether there is a record for the target data extracted in S21 in the map table 1012, and shifts the processing to S23 when there is the record and ends the data adjustment processing when there is no record.

In S23, data adjustment for correcting the inconsistency for the target data extracted by the data adjustment unit 1005 is performed. Detailed processing of data adjustment S23 will be described later with reference to FIG. 15.

Detailed Processing of Query Interpretation

FIG. 12 is a flowchart illustrating the detailed processing of the query interpretation of the first embodiment. First, in S211, the query interpretation unit 1004 receives a type of a data item or quality of data requested by the user, which are designated by the user from SQL, GUI of the UI unit 1006, or the like. The quality of the data is, for example, accuracy or granularity of the data. An SQL interface and the GUI of the UI unit 1006 may be provided in a standalone manner or on the Web. When the type or quality of the data requested by the user is designated in S211, the conversion of the type or quality of the data desired by the user is executed when data adjustment S23 described later is executed.

Examples of the SQL to which the user request received in S211 is designated include SQL for continuous-type data extraction and SQL for discrete-type data extraction. FIG. 13A is a diagram illustrating an example of an SQL query (continuous-type data extraction) of the first embodiment. FIG. 13A illustrates an example in which data items Patient_ID, Test_date, Test_id, and Test_result of records corresponding to a period of which Test_date is from 2016-01-01 00:00:00 to 2020-04-02 23:59:59 are extracted from a table Lab_test.

FIG. 13B is a diagram illustrating an example of an SQL query (discrete-type data extraction) of the first embodiment. FIG. 13B illustrates an example in which data items Patient_ID, Test_date, Test_id, and Test_result of records in which Patient_id is "P00001" and Test_result is "H" or "L" are extracted from the table Lab_test.

Figure 14:
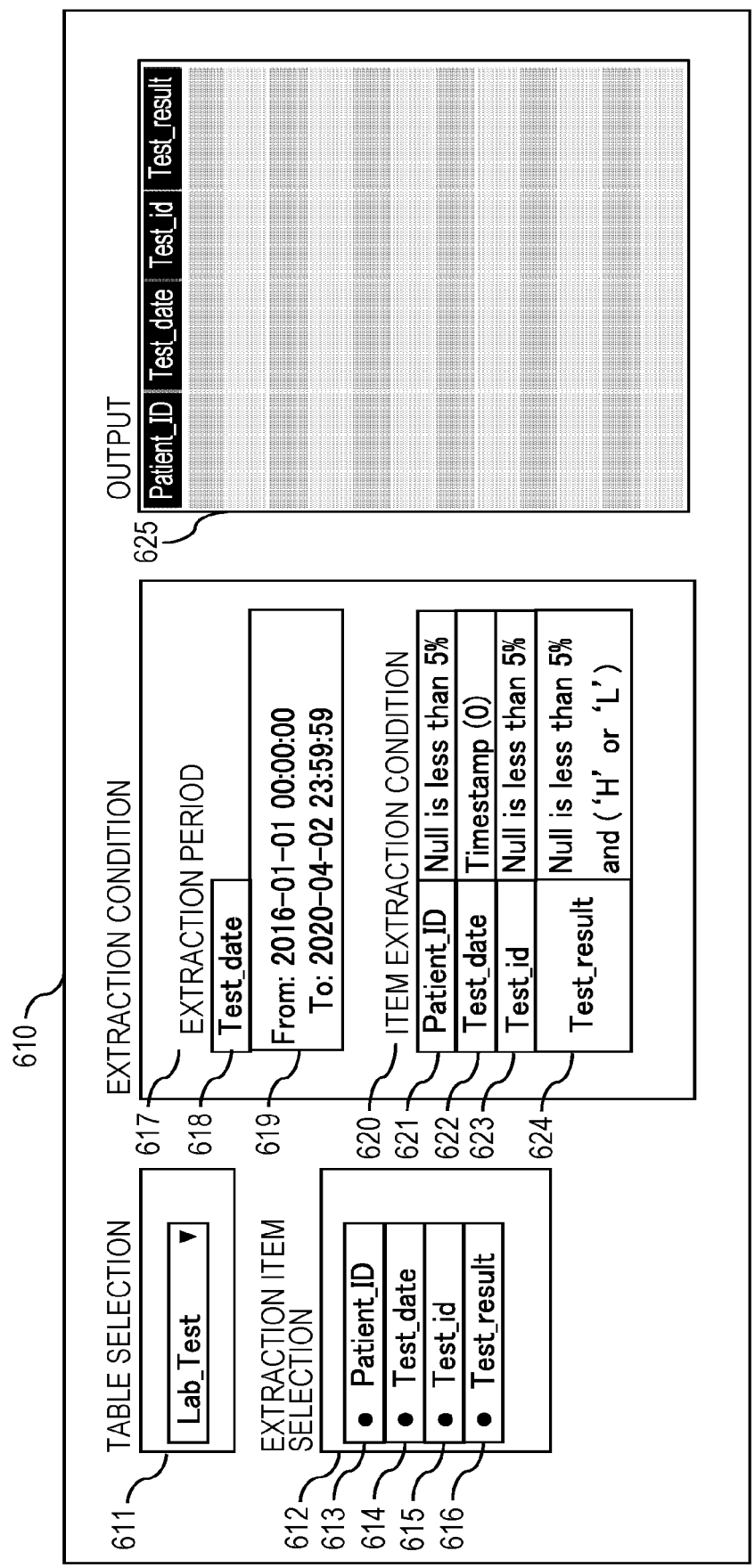
FIG. 14 is a diagram illustrating an example of a GUI for inputting a user request of the first embodiment.

An example of the GUI of the UI unit 1006 in which the user request received in S211 is designated is as illustrated in FIG. 14. FIG. 14 is a diagram illustrating an example of a GUI 610 for inputting the user request of the first embodiment.

The GUI 610 includes a table selection section 611, an extraction item selection section 612 for selecting an item (column) of a record to be extracted from the selected table, an extraction period 617 for designating an extraction period of a record, an item extraction condition 620 for designating an extraction condition of the extraction item selected in the extraction item selection section 612, and an output section 625 for outputting an extraction result corresponding to the extraction condition.

FIG. 14 illustrates an example in which extraction items are Patient_ID 613, Test_date 614, Test_id 615, and Test_result 616 and all the columns are selected in selection fields. In the extraction period 617, when there is time-type data such as Test_date 614 in the extraction item selection section 612, a time range 619 corresponding to Test_date 618 is designated. When the time range 619 is not designated, the entire time range is obtained.

The item extraction condition 620 is an example in which data is extracted under a condition in which Null is less than 5% for Patient_ID 621 or a condition in which a type of Timestamp (0) is set for Test_date 622, Null is less than 5% for the Test_id 622, and Null is less than 5% and a value is 'H' or 'L' for the Test_result 621 for each column selected in the extraction item selection section 612. Data of the extraction result is displayed in the output section 625.

The description returns to FIG. 12. Subsequently, in S212, the query interpretation unit 1004 decomposes the query (or a data extraction condition input from a data extraction application), and extracts the target data and a target period which are access destination data information. The target data may be a dictionary type including a schema name, a target table name, and a target column name, may be a file path or the like, and may be information sufficient to specify data designated by the user.

Detailed Processing of Data Adjustment S23

Figure 15:
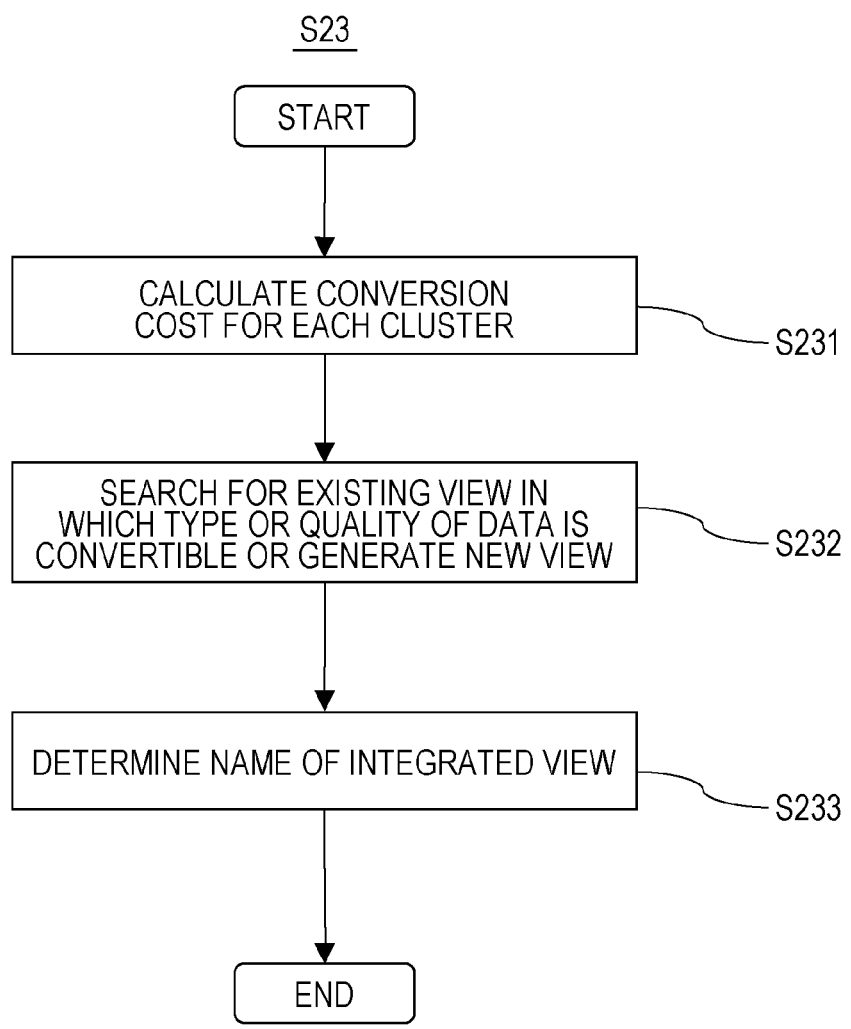
FIG. 15 is a flowchart illustrating detailed processing of data adjustment of the first embodiment.

FIG. 15 is a flowchart illustrating detailed processing of data adjustment S23 of the first embodiment. First, in S231, the data adjustment unit 1005 calculates the conversion cost 1007 for converting the type and quality of the data to another cluster by using an integrated view for each cluster and establishing the consistency based on the target data requested by the user obtained in S212, the data stored in the data lake, and the record of the map table 1012 corresponding to the target data.

For example, the conversion cost 1007 can be calculated as a value proportional to the number of records of the original data 1015 belonging to the cluster. Alternatively, the conversion cost 1007 can be calculated as a value based on the distance 10123 between the clusters, the feature value 1 difference (diff (1)) 10124, and the feature value 2 difference (diff (2)) 10125. Alternatively, the conversion cost 1007 may be calculated as a function related to a product of the number of records to be converted and the conversion cost per record, and the method is not limited to thereto or a combination thereof.

Subsequently, in S232, the data adjustment unit 1005 searches for an existing view in which the type or quality of the target data obtained in S212 can be integrated by establishing the consistency for target data by using the map table 1012 at the minimum conversion cost. The existing view is stored in a predetermined storage region. When there is the existing view, the data adjustment unit 1005 uses the existing view and shifts the processing to S233. The existing view is used, and thus, a processing load of the conversion of the type or quality of the data can be further reduced.

On the other hand, when there is no existing view, the data adjustment unit 1005 converts the cluster for which the conversion cost 1007 calculated in S231 is low into the data type and data format of the cluster for which the conversion cost is maximized. Accordingly, the type or quality of the data can be converted while the conversion cost is suppressed. After the conversion of the data type, the data adjustment unit 1005 generates a new view from the target data requested by the user obtained in S212 by using the map table 1012, and stores the new view in a predetermined storage region.

Subsequently, in S233, the data adjustment unit 1005 temporarily changes the data name (for example, the table name or the file name) of the target data obtained in S212, and sets a name of the integrated view (the existing view or the new view in S232) as the table name and the column name of the target data obtained in S212.

Effects of First Embodiment

In the present embodiment, when there is temporal or spatial inconsistency in a data type of data of a data lake that stores data for an application that performs monitoring, machine learning, and the like by using data, it is possible to reduce man-hours as compared with application modification by generating a view and establishing the consistency so as to satisfy a request level of the user by using the view instead of establishing the consistency by the application modification.

In the present embodiment, not only the inconsistency in the data type but also the inconsistency in the data quality (data granularity or the like) is a consistency establishment target using the view. When the data quality is required to satisfy the user request as in a machine learning application, the quality request of the user can be satisfied by adjusting the target data.

In the present embodiment, the inconsistency in the type or quality of the data is detected in advance, and the inconsistency of the data corresponding to the extraction is corrected by using the integrated view when the query is issued by the user. Thus, when the number of times of the query is issued is small, the consistency can be efficiently established as necessary without performing unnecessary consistency establishment processing.

Second Embodiment

Hereinafter, a second embodiment of the present invention will be described. In the description of the second embodiment, only differences from the first embodiment will be described, and redundant description will be omitted. In the inconsistency detection processing (FIG. 7) of the first embodiment, although the case where the data adjustment is not immediately performed even though the inconsistency is detected and the data adjustment is performed when the query is received (FIG. 11) has been described, the present invention is not limited thereto, and the data adjustment may be immediately executed when the data inconsistency is detected. Hereinafter, this example will be described as the second embodiment.

Figure 16:
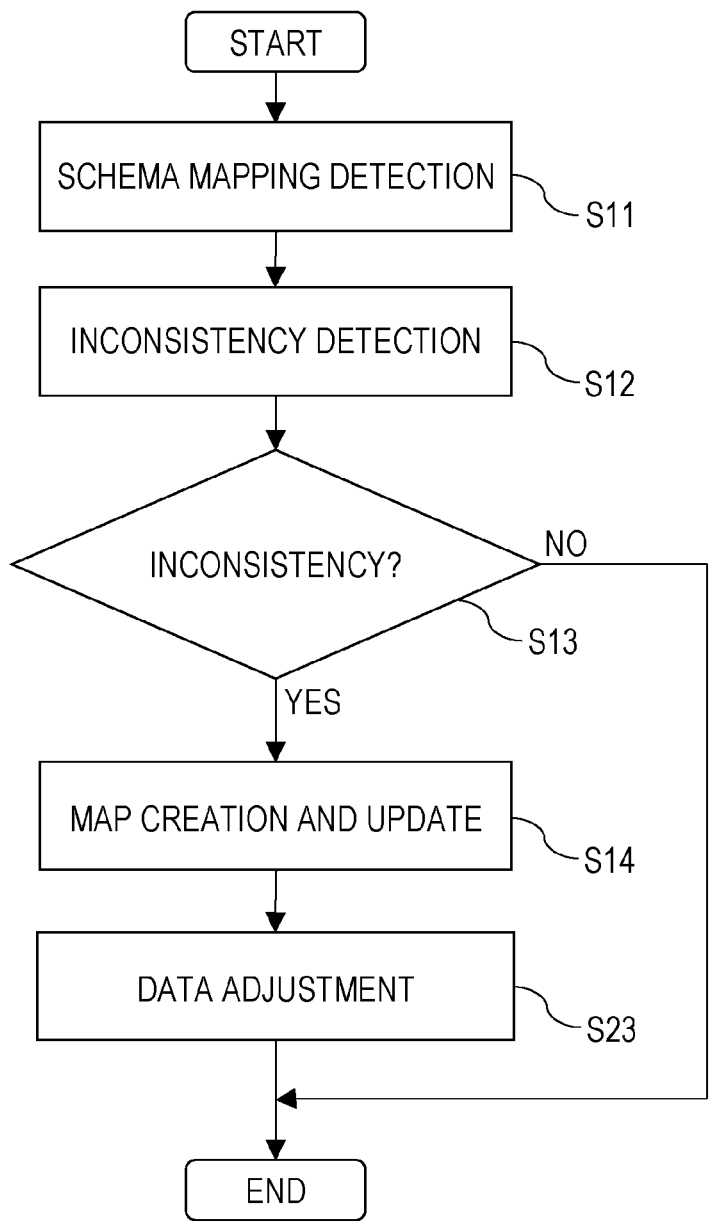
FIG. 16 is a flowchart illustrating data inconsistency detection processing of a second embodiment.

FIG. 16 is a flowchart illustrating data inconsistency detection processing of the second embodiment. The data inconsistency detection processing of the second embodiment is similar to the data inconsistency detection processing (FIG. 7) of the first embodiment from S11 to S14, but is different in that S23 is executed after S14. S23 is processing performed by the data adjustment unit 1005, and is the same as S23 in the data adjustment processing (FIG. 11) of the first embodiment. The data adjustment is performed in S23 of FIG. 16, and a view for adjusting any inconsistency is prepared for any inconsistency. The data inconsistency detection processing is executed periodically or at an instruction timing of an engineer.

Figure 17:
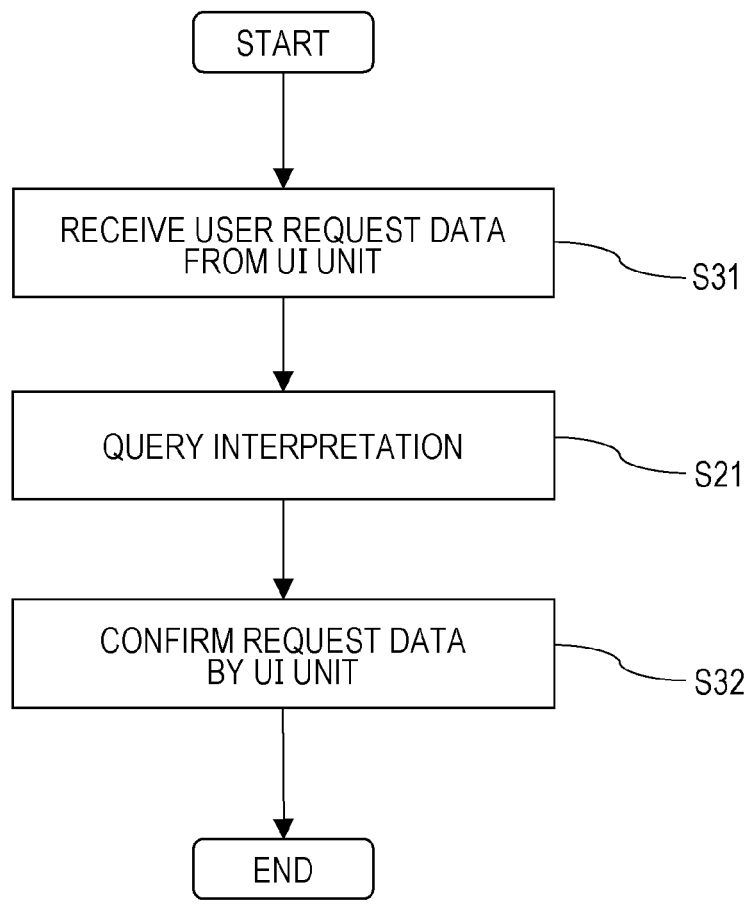
FIG. 17 is a flowchart illustrating request input processing to a data integration system by a user of the second embodiment.

FIG. 17 is a flowchart illustrating request input processing to the data integration system S by the user according to the second embodiment. In this processing, the same GUI 610 as that of the first embodiment illustrated in FIG. 14 is used. In S31, the UI unit 1006 transmits user request data input via the GUI 610 to the query interpretation unit 1004. Subsequently, in S21, the query interpretation unit 1004 interprets the query transmitted in S31. S21 in FIG. 16 is the same processing as S21 in FIG. 11. Subsequently, in S32, the UI unit 1006 displays the data requested by the user on the GUI 610.

An example of the GUI 610 will be described with reference to FIG. 14. Portions input by the user in S31 correspond to the table selection section 611, the extraction item selection section 612, the extraction period 617, and the extraction condition section of the item extraction condition 620. The data obtained in S32 is displayed in the output section 625.

In the second embodiment, a method for receiving the data item and the data quality requested by the user by means of the query interpretation unit 1004 is not limited to the data request via the GUI 610, and may be a method for receiving the data item and the data quality by the query such as SQL.

Effects of Second Embodiment

In the present embodiment, when the inconsistency in the type or quality of the data is detected, the inconsistency of the data is corrected by using the integrated view. Thus, when the number of times the query is issued is large, the inconsistency can be corrected without applying a system load, and data integration can be efficiently performed.

The aforementioned embodiments are described in detail in order to facilitate easy understanding of the present invention, and are not limited to necessarily include all the described components. In the plurality of embodiments and modification examples described above, the device or system configuration may be changed, or a part of the configuration or the processing procedure may be omitted, replaced, or combined without changing the gist of the present invention. In the hardware diagrams and the block diagrams described in FIGS. 1 and 2, only control lines and information lines considered to be necessary for description are illustrated, and not all the control lines and the information lines on a product are necessarily illustrated. Almost all the configurations may be considered to be actually connected to each other.

What is claimed is:

1. A data integration method for improving efficiency and reducing a processing load of a data integration system, the method executed by the data integration system corrects inconsistency in attributes including at least one of type or quality between first data and second data stored in a data lake, the method comprising:
    grouping pieces of the second data based on the attributes of the second data into a plurality of groups;
    calculating feature values of each of the plurality of groups based on certain conditions;

calculating feature values of the first data based on certain conditions;
determining whether there is a group from among the plurality of groups to which the first data belongs based on the feature values of each of the plurality of groups and the feature values of the first data;
outputting an inconsistency detection flag for the first data that does not have belong to any of the plurality of groups;
receiving a request to output data including the first data;
extracting the second data and the attributes of the second data from the request;
calculating a conversion cost for each of the plurality of groups to convert the attributes of the first data into an other group by using an integrated view for each of the plurality of groups and establishing a consistency to correct the inconsistency based on the second data from the request;
converting the attributes of the first data based on the conversion cost;
searching for and selecting an existing view in which the attributes of the second data can be integrated by establishing the consistency of the second data based on the first data at a minimum conversion cost; and
correcting the inconsistency by changing information other than the attributes of the second data to be information other than the attributes of the existing view to create changed second data; and
displaying the changed second data.

2. The data integration method according to claim 1, wherein
the inconsistency between the attributes is detected by calculating the feature values of each of the plurality of groups, calculating the feature values of the first data, and determining an inconsistency for the first data in advance, and
calculating the conversion cost and converting the attributes are executed when an acquisition of the first data and the second data is requested by a user.

3. The data integration method according to claim 1, wherein
calculating the conversion cost and converting the attributes are executed when the inconsistency between the attributes is detected.

4. The data integration method according to claim 1, further comprising:
dividing target data which is the second data for each table name and each item name of a data model;
grouping pieces of data in which table names and item names are the same and pieces of data in which at least one of the table names or the item names are different but contents are the same into the same group among the pieces of target data; and
converting the pieces of data grouped into the same group into a common data schema.

5. The data integration method according to claim 4, wherein
when there is an existing group into which pieces of data having the same table name and the same item name as new data which is the first data are grouped and a difference in feature value between the new data and the existing group satisfies a predetermined condition in a case where a center value of feature values of the pieces of data belonging to the existing group is a feature value of the existing group, the inconsistency is not detected by determining that the new data belongs to the existing group, and when there is not the existing group in which the pieces of data having the same table name and the same item name as the new data or the difference in feature value between the new data and the existing group does not satisfy the predetermined condition, the inconsistency is detected by determining that the new data does not belong to the existing group and belongs to a new group.

6. The data integration method according to claim 1, wherein
the inconsistency is corrected by using an existing integrated view.

7. The data integration method according to claim 1, wherein
the inconsistency is corrected so as to satisfy a type or quality of data requested by a user.

8. The data integration method according to claim 1, wherein integrating the attributes of the first data converted into the existing view reduces the processing load of the data integration system by establishing the consistency, and
wherein establishing the consistency includes using data quality to satisfy the request.

9. The data integration method according to claim 1, wherein improving the efficiency and reducing the processing load of the system is achieved by automatically detecting the inconsistency in the attributes and automatically adjusting the attributes based on the request.

10. A data integration system that corrects inconsistency in attributes including at least type or quality between first data and second data stored in a data lake, for improving efficiency and reducing a processing load of the system, comprises:
a memory;
an input/output device configured to receive the first data and the second data; and
a processor communicatively coupled to the memory and the input/output device, the processor is configured to:
group pieces of the second data based on the attributes of the second data into a plurality of groups,
calculate feature values of each of the plurality of groups based on certain conditions,
calculate feature values of the first data based on certain conditions,
determine whether there is a group from among the plurality of groups to which the first data belongs based on the feature values of each of the plurality of groups and the feature values of the first data,
output an inconsistency detection flag for the first data that does not have belong to any of the plurality of groups,
the input/output device receives a request to output data including the first data,
the processor is configured to:
extract the second data and the attributes of the second data from the request,
calculate a conversion cost for each of the plurality of groups to convert the attributes of the first data into an other group by using an integrated view for each of the plurality of groups and establishing a consistency to correct the inconsistency based on the second data from the request,
convert the attributes of the first data based on the conversion cost,
search for and select an existing view that matches the attributes of the first data in the integrated view,
select the existing view in which the attributes of the second data can be integrated by establishing the consistency of the second data based on the first data at a minimum conversion cost, and correct the inconsistency by changing information other than the attributes of the second data to be information other than the attributes of the existing view to create changed second data, and the input/output device is configured to display the changed second data.

11. The data integration system according to claim 10, wherein integrating the attributes of the first data converted into the existing view reduces the processing load of the data integration system by establishing the consistency, and wherein establishing the consistency includes using data quality to satisfy the request.

12. The data integration system according to claim 10, wherein improving the efficiency and reducing the processing load of the system is achieved by automatically detecting the inconsistency in the attributes and automatically adjusting the attributes based on the request.

* * * * *